United States Patent
Naqvi et al.

(10) Patent No.: US 11,409,846 B2
(45) Date of Patent: Aug. 9, 2022

(54) USER CONTROLLED TRUSTED AND ISOLATED COMPUTING ENVIRONMENTS

(71) Applicant: Sensoriant, Inc., Cedar Knolls, NJ (US)

(72) Inventors: Shamim A. Naqvi, Morristown, NJ (US); Robert Frank Raucci, New York, NY (US)

(73) Assignee: Safelishare, Inc., Morristown, NJ (US)

( * ) Notice: Subject to any disclaimer, the term of this patent is extended or adjusted under 35 U.S.C. 154(b) by 8 days.

(21) Appl. No.: 17/149,088

(22) Filed: Jan. 14, 2021

(65) Prior Publication Data
US 2022/0222323 A1    Jul. 14, 2022

(51) Int. Cl.
*G06F 21/57* (2013.01)
*G06F 21/12* (2013.01)
*H04L 9/08* (2006.01)
*G06F 21/71* (2013.01)

(52) U.S. Cl.
CPC ............. *G06F 21/12* (2013.01); *G06F 21/57* (2013.01); *G06F 21/71* (2013.01); *H04L 9/0819* (2013.01); *G06F 2221/034* (2013.01); *G06F 2221/0753* (2013.01); *G06F 2221/2149* (2013.01)

(58) Field of Classification Search
CPC ........ G06F 21/12; G06F 21/57; G06F 21/575; G06F 21/71; G06F 2221/034; G06F 2221/0753; G06F 2221/0784; G06F 2221/2149; H04L 9/0819
See application file for complete search history.

(56) References Cited

U.S. PATENT DOCUMENTS

| | | | |
|---|---|---|---|
| 4,562,305 A | 12/1985 | Gaffney | |
| 2004/0093505 A1* | 5/2004 | Hatakeyama | G06F 21/12 713/189 |
| 2007/0288740 A1* | 12/2007 | Dale | G06F 9/4405 713/2 |
| 2008/0181414 A1 | 7/2008 | Deaver | |
| 2010/0070953 A1 | 3/2010 | Velten et al. | |
| 2010/0153745 A1 | 6/2010 | Onno | |
| 2011/0035601 A1* | 2/2011 | Davidson | G06F 21/10 713/190 |
| 2011/0296203 A1* | 12/2011 | Henry | G06F 21/72 713/190 |
| 2012/0260102 A1* | 10/2012 | Zaks | G06F 21/71 713/189 |
| 2017/0041296 A1 | 2/2017 | Ford et al. | |
| 2017/0214523 A1 | 7/2017 | Pebay-Peyroula et al. | |

(Continued)

OTHER PUBLICATIONS

Cappaert et al., Towards Tamper Resistant Code Encryption: Practice and Experience, 2008.*

(Continued)

*Primary Examiner* — Minh Dinh
(74) *Attorney, Agent, or Firm* — Mayer & Williams, PC; Stuart H. Mayer

(57) ABSTRACT

Systems and techniques described herein are concerned with providing supervisory control of computer programs. In particular, a method for executing application code defining a computer program includes providing a "kill switch" to the operator, which allows the operator to disable the computer program. The kill switch is configured so that the computer program is incapable of over-riding it.

12 Claims, 8 Drawing Sheets

(56) References Cited

U.S. PATENT DOCUMENTS

2017/0302697 A1  10/2017  Litva et al.
2018/0060596 A1  3/2018  Hamel et al.

OTHER PUBLICATIONS

Zhang et al., Tamper-Resistant Whole Program Partitioning, 2003.*
Broadnax et al., Towards Efficient Software Protection Obeying Kerckhoffs's Principle using Tamper-proof Hardware, 2018.*
Griffin, "Strengthening Software Self-Checksumming via Self-Modifying Code" 1-10, 21st Annual Computer Security Applications Conference, Dec. 5, 2005, pp. 1-10.

* cited by examiner

| Partition# | Instructions | Encryption Key | Decryption Key |
|---|---|---|---|
| 1 | Instruction 1<br>Instruction 2<br>...<br>Instruction 10 | Hex FFFA234... | Hex BCDA3A2... |
| 2 | Instruction 11<br>Instruction 12<br>... | Hex FBC123098... | Hex ABC123D ... |
| 3 | ... | ... | ... |

FIG. 8

USER CONTROLLED TRUSTED AND ISOLATED COMPUTING ENVIRONMENTS

CROSS-REFERENCE TO RELATED APPLICATIONS

This application is related to U.S. application Ser. No. 17/094,118, filed Nov. 10, 2020 which claims the benefit of U.S. Provisional Application No. 62/934,691, filed Nov. 13, 2019 and U.S. Provisional Application No. 62/923,851, filed Oct. 21, 2019, the contents of which are incorporated herein by reference.

FIELD OF THE INVENTION

The present invention relates generally to providing supervisory and, in some cases, shared control of computer programs. In some cases, the computer programs may have the capability of operating autonomously.

BACKGROUND

Computer programs are being used in many aspects of social lives and play an increasingly powerful role in a large number of situations and domains. Technology to control such programs is needed to assure manufacturers, consumers and society that their various constraints and demands are met and furthermore that a computer cannot be allowed to act in an unrestricted and uncontrolled manner.

SUMMARY

In accordance with one aspect of the subject matter described herein, a method is provided for controlling execution of application code defining a computer program. The method comprises: (i) receiving a request from a first trusted and isolated computing environment for receipt of a first partition group of the application code, the application code being formed from a plurality of machine executable instructions that are partitioned into a plurality of partition groups that each contain at least one of the machine executable instructions in an encrypted form, wherein a trusted computing environment is a computing environment whose computer code is able to be attested by comparing a digest of the computing environment to a baseline digest of the computing environment that is available to third parties to thereby verify computing environment integrity, an isolated computing environment being a computing environment in which only a specified maximum number of application processes and specified system processes implementing the computing environment are able to operate; (ii) responsive to receipt of the request, sending the encrypted machine executable instructions in the first partition group from a second trusted and isolated computing environment to the first trusted and isolated computing environment; (iii) subsequent to receipt of the first partition group by the first trusted and isolated computing environment, receiving a request from the first trusted and isolated computing environment for one or more decryption keys for decrypting the encrypted machine executable instructions in the first partition group and sending the one or more decryption keys to the first trusted and isolated computing environment; and (iv) repeating (i)-(iii) for one or more subsequent partition groups that make up the application code unless a termination command is received from a user by the second trusted and isolated computing environment, the termination command being configured to prevent from being sent to the first trusted and isolated computing environment any of the subsequent partition groups in the plurality of partition groups and/or any of the one or more decryption keys for decrypting the encrypted machine executable instructions in the subsequent partition groups.

In accordance with another aspect of the subject matter described herein, a request from the first trusted and isolated computing environment for receipt of one of the subsequent partitions is received subsequent to initiation of execution of the machine executable instructions in previously received ones of the first partition group.

In accordance with another aspect of the subject matter described herein, the requests from the first trusted and isolated computing environment are received by control logic operating in the second computing environment such that the second computing environment represents an execution state of processes managed by the control logic.

In accordance with another aspect of the subject matter described herein, the plurality of partition groups that each contain at least one of the encrypted machine executable instructions and the decryption keys for decrypting the encrypted machine executable instructions are stored in a page map associated with the control logic.

In accordance with another aspect of the subject matter described herein, the termination command causes the page map to be cleared of the partition groups and/or the decryption keys associated with the partition groups.

In accordance with another aspect of the subject matter described herein, the termination command causes the encrypted machine executable instructions in the page map to be re-encrypted with a different encryption key from that previously used such that the decryption keys in the page map are unable to decrypt the encrypted machine executable instructions.

In accordance with another aspect of the subject matter described herein, the first and second computing environments are located in a common physical computing machine.

In accordance with another aspect of the subject matter described herein, the first and second computing environments are located in different physical computing machines.

In accordance with another aspect of the subject matter described herein, each of the encrypted machine executable instructions in a common one of the partition groups are decrypted using a common decryption key.

In accordance with another aspect of the subject matter described herein, encrypted machine executable instructions in different ones of the partition groups are decrypted using different decryption keys.

In accordance with another aspect of the subject matter described herein, the termination command is received from the user and responses are prevented from being sent in response to any further requests for any of the subsequent partition groups in the plurality of partition groups and/or any of the one or more decryption keys for decrypting the subsequent partition groups.

In accordance with another aspect of the subject matter described herein, a method is provided for executing application code defining a computer program, comprising: (i) requesting from a second trusted and isolated computing environment receipt of a first partition group of the application code, the application code being formed from a plurality of machine executable instructions that are partitioned into a plurality of partition groups that each contain at least one of the machine executable instructions in an encrypted form, wherein a trusted computing environment is a computing environment whose computer code is able to be attested by comparing a digest of the computing environment to a baseline digest of the computing environment that is available to third parties to thereby verify computing environment integrity, an isolated computing environment being a computing environment in which only a specified maximum number of application processes and specified system processes implementing the computing environment are able to operate; (ii) receiving the encrypted machine executable instructions in the first partition group from the second trusted and isolated computing environment; (iii) requesting from the second trusted and isolated computing environment one or more decryption keys for decrypting the encrypted machine executable instructions in the first partition group and receiving the one or more decryption keys in the first trusted and isolated computing environment; and (iv) repeating (i)-(iii) for one or more subsequent partition groups that make up the application code unless a termination command is received from a user by the second trusted and isolated computing environment, wherein, responsive to the termination command, no further ones of the subsequent partition groups and/or any of the one or more decryption keys for the subsequent partition groups are received by the first trusted and isolated computing environment. from the user by the second trusted and isolated computing environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 show one example of the logical arrangement of a page map that stores the encrypted and partitioned decision logic.

DETAILED DESCRIPTION

Introduction

Figure 1:
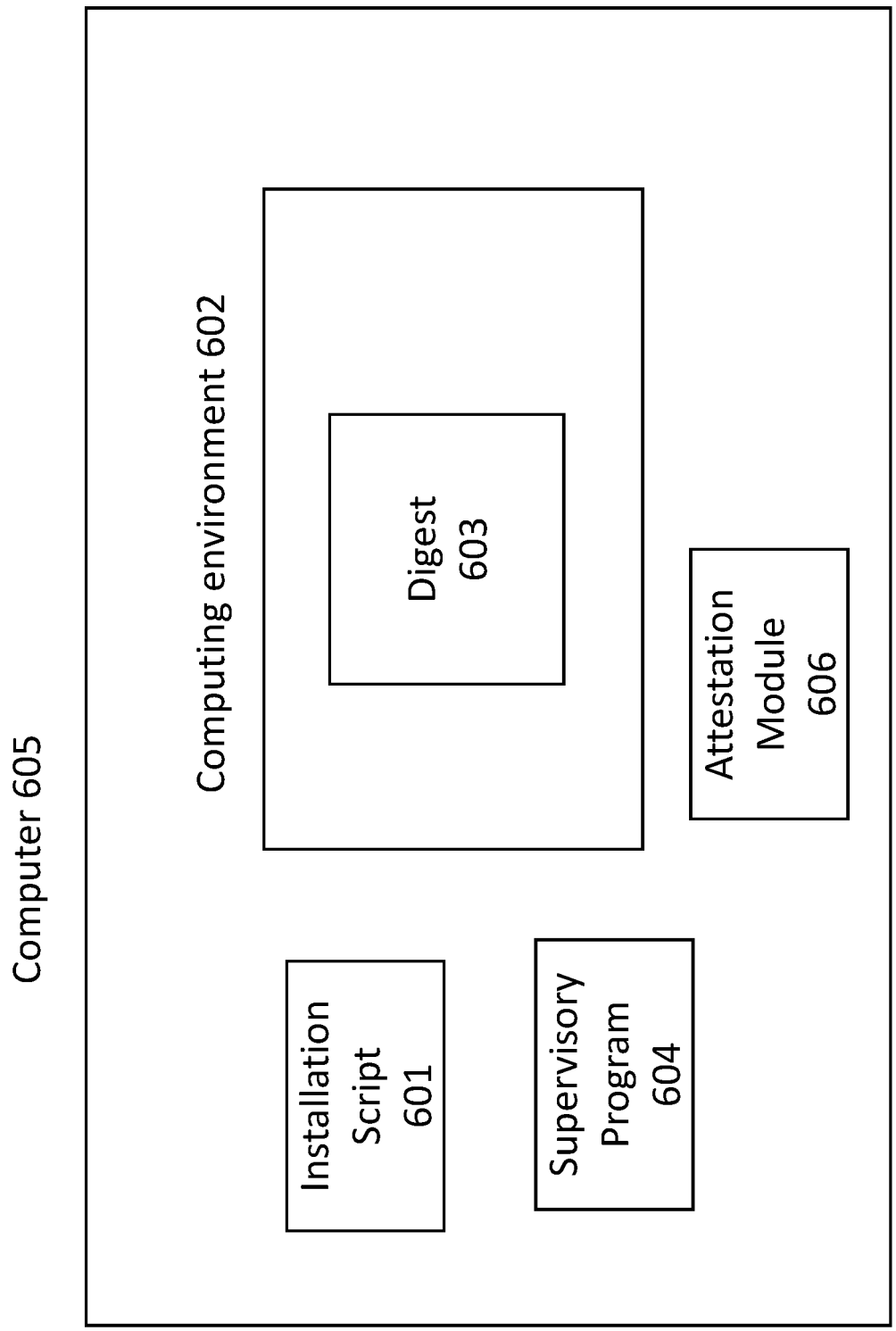
FIG. 1 shows the components of one example of a computing environment created in one or more computing entities.

Advances in computing technology have allowed the creation of computer programs that have the capability of making decisions in many aspects of people's lives including social, health and financial domains. Recent advances have extended the domain of computer programs to reason about heuristic data and derive decisions that previously were entrusted to human specialists. For example, computer programs based on machine learning technology are being used in medical, retail and financial applications. In some cases, such programs have the capability of operating autonomously and are being incorporated in a wide variety of machines, ranging from relatively simple consumer appliances (e.g., on factory floors and assembly lines) to more complex machines that are used in highly specialized applications (e.g., medical diagnosis of human ailments). For example, machines are being used to perform house cleaning tasks, machines are being used on factory floors to assemble products, and medical data such as X-rays is being analyzed and interpreted by computer programs. In some cases, such machines may be categorized as a type of robot.

As computer programs become more autonomous in their operations and their learning capabilities improve, many technologists and observers have speculated on the deleterious impact of programs "going rogue," i.e., the decision making of programs may become harmful to consumers. Such behavior, e.g., may be the result of malicious entities gaining control of the computer program. It may also be due to the computer program exhibiting aberrant behavior, i.e., behavior unanticipated by its designers. No less a luminary than the former Lucasian Professor at Cambridge University, Stephen Hawking, has written about the dangers posed by uncontrolled machine learning and artificial intelligence technologies. Many science fiction stories and movies speculate on such unintended behaviors of computer programs, e.g., the famous HAL computer in the movie 2001: A Space Odyssey is shown making several seemingly aberrant and unanticipated decisions that come as a surprise to its users.

Such speculation has understandably caused concern in society and may impede the acceptance and use of the technology of computer programs.

In one aspect, the systems and techniques described herein are concerned with providing supervisory control of computer programs. For example, in one embodiment, the present disclosure is concerned with providing a "kill switch" to the operator, which allows the operator to disable the program. Moreover, the kill switch may be designed so that the computer program is incapable of over-riding it.

In another embodiment, two supervisory entities, e.g., a user/operator and a manufacturer of a computer program, are provided supervisory but non-interchangeable roles and commands to jointly control the behavior of the computer program. Again, the computer program may be incapable of over-riding the commands of its supervisors.

In yet other embodiments, methods are provided whereby the decisions, or the actions of computer programs can be trusted, and the software code of the programs can be protected from intrusive software and malware, etc.

The present invention relates to computer programming technology in general and to computer programs dealing with heuristic data in particular.

Before describing how the behavior of computer programs are controlled in the manner described above, various concepts that are employed will be first briefly reviewed.

Encryption Technology

A public key cryptographic system comprises a function that can generate a pair of keys (S, P) where S is called the secret/private key and P is called the public key. We can use the public key to encrypt data in such a manner that it can only be decrypted by the corresponding secret key, and vice versa. For example, user Bob may give his public key to user Alice and keep the secret key for himself. User Alice uses Bob's public key to encrypt data that she wishes to send to Bob. Upon receipt, Bob uses his private key to decrypt the received data. Only Bob can decrypt the data since he has the secret key. No other party who may have received the data can decrypt it. For details, see Rivest, R., Shamir, A., Adleman, L. "A Method for Obtaining Digital Signatures and Public-Key Cryptosystems." C. ACM 21(2), 1978 (also known as RSA encryption). Many encryption functions are known, e.g., RSA, such that no efficient ("tractable") algorithms are known for finding their corresponding decryption keys.

As an example of the use of public key cryptography as enabling technology in the present invention, consider an algorithm embodied in a computer program. To safeguard ownership of the algorithm and to prevent it from being accessed by any other entity, a pair of public/secret keys may be generated, and the algorithm may be encrypted with the public key. As mentioned above, the encrypted algorithm can only be decrypted by using the corresponding secret key. Since it is known in the literature that public key cryptography belongs to the class of intractable computations, we can assume that the algorithm is protected for all practical purposes.

In the technologies described herein, secret/public key pair technology may be used to prevent computer programs or other entities from accessing a resource, e.g., decrypting the contents of a section or region of computer memory, unless they provide the needed key of a pre-determined key pair.

Computability Theory

It has been shown in computability theory that no algorithm, e.g., a computer program, can exist that takes another computer program as input and decides that the inputted program terminates on all inputs. That is, the termination or halting behavior of arbitrary programs cannot be determined by any deterministic, i.e., non-random, method. This property is also known in the literature as the undecidability of the halting problem (cf. Church, Alonzo (1936). *An Unsolvable Problem of Elementary Number Theory*. American Journal of Mathematics. 58 (2): 345-363. Turing, Alan (1937). *On computable numbers, with an application to the Entscheidungsproblem*. Proceedings of the London Mathematical Society, Series 2, Volume 42 (1937), pp 230-265. Davis, Martin (1965). *The Undecidable: Basic Papers on Undecidable Propositions, Unsolvable Problems and Computable Functions*. New York: Raven Press. The term "halting problem" is generally attributed to M. Davis.) The halting problem represents a limit of knowledge applicable universally and fundamentally. It is an "impossibility" result in the sense that it cannot ever be solved.

Note that the halting problem may not apply to a particular program; it applies to all "program-input" pairs. For the purposes of the present discussion, we note that computer programs can have arbitrary complexity. Computer programs such as those considered in the present invention are expected to be quite complicated and many human programmers find it difficult to understand their computational properties and behaviors completely. For example, many machine learning programs that show impressive decision-making capabilities are based on neural and convolutional neural network technologies, and it has been reported in the literature that human programmers do not often understand the behavior of such programs.

Apple Computer, Inc. accepts third-party computer programs in its "app store" which it then subjects to a combined manual and automatic analysis to verify that their actions meet certain guidelines and restrictions, e.g., that the third-party programs are free of pornography. Such manual curation is both time consuming and expensive, but is necessary because no automatic, i.e., computational, means are possible for a complete analysis of the behavior of general arbitrary computer programs on all inputs.

In general, an undecidable problem is a problem where no algorithm can exist that will decide the problem with a "yes/no" answer and terminate. For example, the problem of showing that a program is correct with respect to a given specification is known to be undecidable. (cf. Dijkstra, E. W. "Program Correctness". U of Texas at Austin, Departments of Mathematics and Computer Sciences, Automatic Theorem Proving Project, 1970. Web.) This property is also known as total correctness of programs, in contrast to the partial correctness property in which if an algorithm returns "yes," it will be correct. Consider, for instance, a program that searches a list of integers $\{1, 2, 3, \ldots\}$ to verify that there exists an odd perfect number. Such a program can trivially check for "perfectness" (e.g., division by 2), but is not known to terminate because the question of the existence of odd perfect numbers remains unresolved. (A perfect number is a positive integer which equals the sum of its proper divisors, e.g., 6 is equal to the sum of its proper divisors, 1, 2 and 3. Another example: 28 is a perfect number since $28=1+2+4+7+14$).

Consider a computer program, i.e., an algorithm, endowed with the capability of making decisions in some domain of the real world. All background art points to the expectation that such an algorithm will be quite complex. It will be difficult for a programmer to quantify and capture all possible ways in which a program may exhibit aberrant or unexpected behavior. Thus, the probability that sufficiently complex computer programs will exhibit aberrant behavior is finite and this probability increases with the complexity of the algorithm. Therefore, a user will need a capability to disable the program, if and when the program exhibits aberrant behavior.

Intractable Problems

A class of problems, called intractable problems, is known whose members are programs that remain unsolved because not enough resources can be acquired or provisioned to arrive at a solution, e.g., enough time that the computation terminates successfully or enough memory to hold the state of the computation. In principle, if enough resources were to become available, methods exist to solve the class of intractable problems. In practice, we can always set the size of an intractable problem to make it practically impossible to solve it, e.g., require time of the order of the life of the universe, etc. (The class of intractable problems includes, inter alia, the class of NP (Non-deterministic Polynomial) complete problems.

The systems and techniques described herein employ a defining feature of intractable problems, namely, that intractable problems (of a suitable size) present practical limits to what can be computed by humans and machines. A number of cryptographic problems, e.g., the problem of finding ciphers for RSA keys mentioned above, are known to be intractable. If a suitable length of the encryption/decryption keys is chosen, the ensuing RSA problem will be practically unsolvable. Thus, programs will be unable to solve intractable problems of a suitable size. Therefore, if the basic mechanism by which a computer program operates is tied to finding a solution of a suitably sized intractable problem, the program's basic operating mechanism will fail.

Compilation & Interpretation of Code into Executable Instructions

A computer executes machine instructions using what is called "fetch-execute" cycle during which the Central Processing Unit (CPU) fetches a fixed length data element (e.g., length of 64 bits) from memory (called an instruction), loads it into a register and executes it as per its pre-programmed hardware logic.

A compiler is a computer program that accepts as input a computer program (typically statements in a higher-level programming language) and outputs a set of instructions in a lower-level programming language (e.g., assembler). The assembler is then typically assembled or compiled into machine code, i.e., a set of machine instructions.

In contrast, an interpreter is a computer program that translates one high-level programming statement into executable instruction(s). That is, the input to an interpreter is a single (higher-level programming) statement and the output is one or more machine executable instructions.

For the purposes of the inventions described herein, we use the term "instruction" to refer to a machine executable instruction.

Cryptographic Hash Functions and Digests

A cryptographic hash function is a function or an algorithm that takes an arbitrary sized input (often called the message) and produces a per-determined fixed sized output (called the digest). It is a one-way function in the sense that it is computationally exorbitant to infer/derive the input from the output. (Only brute force algorithms are known to attempt to break the one-way property of well-known hash functions such as SHA-256, etc.) Hash functions are usually required to be deterministic in that the same message input produces the same digest and that two different inputs do not produce the same output, i.e., the no collision property. For further details, see O. Goldreich: *Foundations of Cryptography*, Vol. I & II, Cambridge University Press, 2001 & 2004.

In the present case (cryptographic) hash functions are used to create computing environments that can be trusted. One way to achieve trust in a computing environment is by allowing the code running in an environment to be verified as follows.

We refer to the process of achieving trust as attestation. It provides a way to ensure that the code used to create a computing environment can be compared to a known and trusted copy of the code, i.e., a baseline, that is stored in an escrow service or is available in a publicly known location. If the comparison is successful, then the code creating a computing environment can be trusted. Furthermore, if the computing environment at any instant of time contains only code that can be attested and no other code is present in the computing environment (a condition we refer to as isolation and describe later), then it can be asserted that the computing environment can be trusted since it does not contain any unknown code and was created by code whose provenance is known and verified.

We consider computers whose boot logic, i.e., logic that the computer executes when it is first powered on, is configured to create computing environments. Note that boot logic is typically considered as a part of the supervisory programs of computers. Further, we assume that the supervisory programs of the computer contain a known hash function such as SHA-256.

The attestation process may be implemented as a combination of hardware, software and/or firmware. In some computers a so-called attestation module is dedicated to providing the attestation service.

Trusted and Isolated Computing Environments

Given the prevalent situation of frequent malicious attacks on computing machinery, there is concern that a computer program may be hijacked by malicious entities. Can a program's code be secured against attacks by unauthorized and malicious entities? One possibility is for an enterprise to develop a potential algorithm and put it up in a publicly accessible place where it may be analyzed, updated, edited and improved by the developer community. After some time during which this process has been used, the algorithm can be "expected" to be reasonably safe against intrusive attacks, i.e., it garners some trust from the user community. As one learns more from the experiences of the developers, one can continue to increase one's trust in the algorithm. However, complete trust in such an algorithm can never be reached according to the results of computability theory. Importantly, one would like to assume that the original developer of the algorithm is being honest and not manipulating the algorithm, or that the algorithm, e.g., does not have some hidden code that can be triggered at some future date or by some particular input. We also need to assure that malicious actors do not have access to such a computer program.

It should be noted that Bitcoin, Ethereum and certain other cryptocurrencies, and some open-source enterprises use such methods of gaining the community's trust by making their source code available on public sites. Any person may then download the software so displayed and, e.g., become a "miner," i.e., a member of a group of computer programs that makes processing decisions based on the consensus of a majority of the group.

U.S. patent application Ser. No. 17/094,118, which is incorporated by reference herein in its entirety, proposes a different method of gaining trust. As discussed therein, a computation is a term describing the execution of a computer algorithm on one or more datasets. (In contrast, an algorithm or dataset that is stored, e.g., on a storage medium such as a disk, does not constitute a computation.) The term process is used in the literature on operating systems to denote the state of a computation and we use the term, process, to mean the same herein. A computing environment is a term for a process created by software contained within the supervisory programs, e.g., the operating system of the computer (cluster), that is configured to represent and capture the state of computations, i.e., the execution of algorithms on data, and provide the resulting outputs to recipients as per its configured logic. The software logic that creates computing environments (processes) may utilize the services provided by certain hardware elements of the underlying computer (or cluster of computers).

U.S. patent application Ser. No. 17/094,118 creates computing environments which are guaranteed to be isolated and trusted. As explained below, an isolated computing environment is an environment that supports a fixed or maximum number of application processes and specified system processes. A trusted computing environment is an environment in which the digest of the code running in the environment has been verified against a baseline digest.

In particular, we may use (cryptographic) hash functions to create technology that can be used to create computing environments that can be trusted. One way to achieve trust in a computing environment is by allowing the code running in an environment to be verified is by using cryptographic hash functions/digests.

That is, a computing environment is created by the supervisory programs which are invoked by commands in the boot logic of a computer at boot time which then use the hash function, e.g., SHA-256, to take a digest of the created computing environment. This digest may then be provided to an escrow service to be used as a baseline for future comparisons.

FIG. 1 shows an arrangement by which a computing environment 602 created in computer 605 can be trusted using the attestation module 606 and supervisory programs 604.

Figure 2:
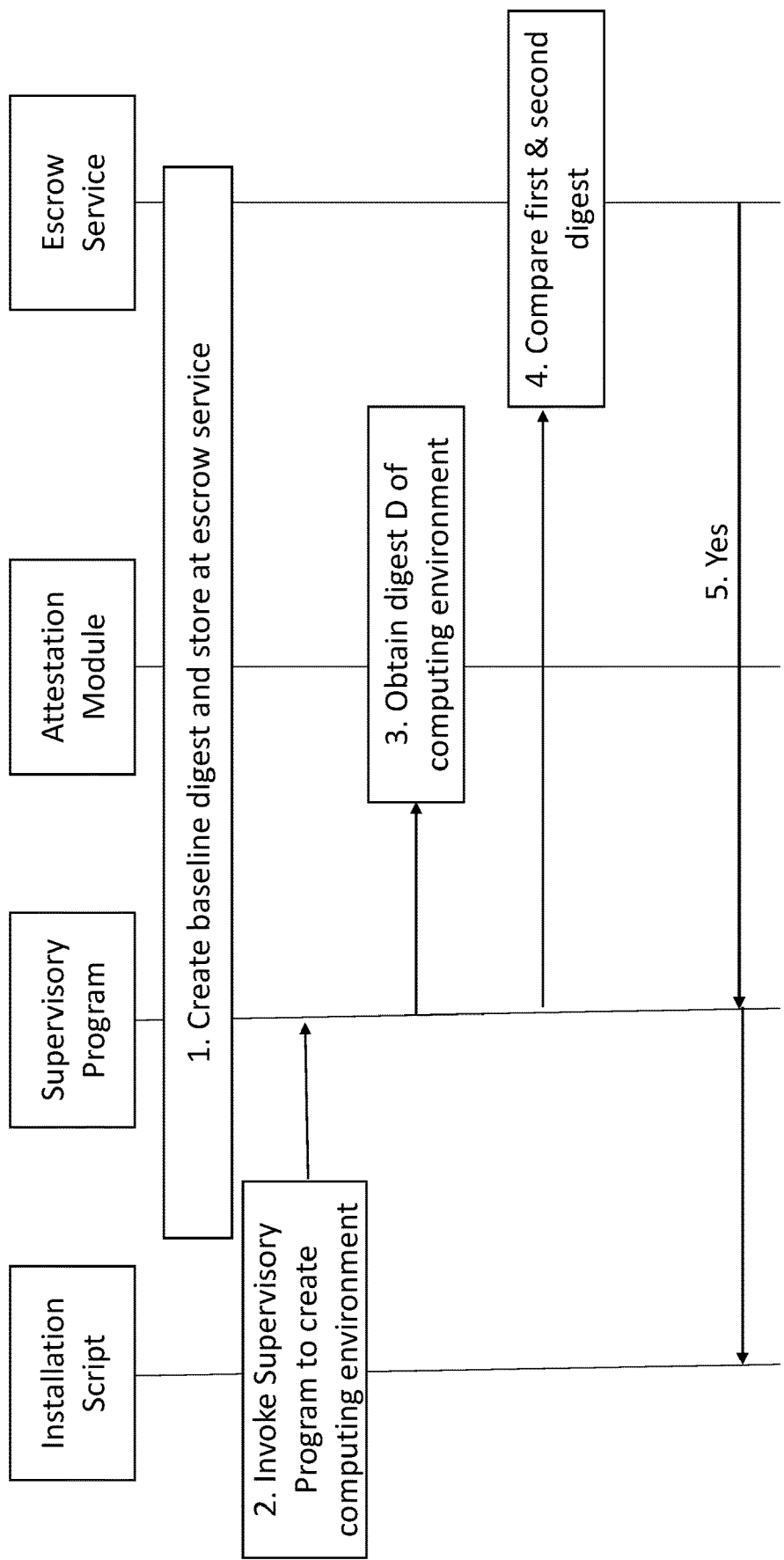
FIG. 2 shows a method for establishing a trusted computing environment from the computing environment shown in FIG. 1.

FIG. 2 shows the method for trusting the computing environment 602.

Method: Attest a computing environment
  Input: Supervisory program 604 of a computer 605 provisioned with attestation module 606, installation script 601.
Output: "Yes" if computing environment 602 can be trusted, otherwise "No."
  1. Provisioning step: Boot the computer. Boot logic is configured to invoke attestation method. Digest is obtained and stored at escrow service as "baseline digest."
  2. Initiate installation script which requests supervisory programs to create computing environment.
  3. Logic of computing environment requests Attestation Module to obtain a digest D of the created computing environment.
  4. Logic of computing environment requests escrow service to compare the digest D against the baseline digest.
  5. Escrow service reports "Yes" or "No" accordingly to the logic of the computing environment which, in turn, informs the installation script.

Note that the installation script is an application-level computer program. Any application program may request the supervisory programs to create a computing environment which then use the above method to verify if the created environment can be trusted. Boot logic of the computer may also be configured, as described above, to request the supervisory programs to create a computing environment.

Whereas the above process can be used to trust a computing environment created on a computer, we may in certain cases require that the underlying computer must be trusted as well. That is, can we trust that the computer was booted securely and that its state at any given time as presented by the contents of its internal memory registers can be trusted.

The attestation method may be further enhanced to read the various PCRs (Platform Configuration Registers) and take a digest of their contents. In practice, we may concatenate the digest obtained from the PCRs with that obtained from a computing environment and use that as a baseline for ensuring trust. In such cases, the attestation process which has been upgraded to include PCR attestation may be referred to as a measurement. Accordingly, in the examples presented below, all references to obtaining a digest of a computing environment are intended to refer to obtaining a measurement of the computing environment in alternative embodiments.

Note that a successful measurement of a computer implies that the underlying supervisory program has been securely booted and its state and that of the computer as represented by data in the various PCR registers is the same as the original state, which is assumed to be valid since we may assume that the underlying computer(s) are free of intrusion at time of manufacturing. Different manufacturers provide facilities that can be utilized by the Attestation Module to access the PCR registers. For example, some manufactures provide a hardware module called TPM (Trusted Platform Module) that can be queried to obtain data from PCR registers.

As mentioned above, U.S. patent application Ser. No. 17/094,118 also creates computing environments which are guaranteed to be isolated in addition to being trusted. The notion of isolation is useful to eliminate the possibility that an unknown and/or unauthorized process may be "snooping" while an algorithm is running in memory. That is, a concurrently running process may be "stealing" data or effecting the logic of the program running inside the computing environment. An isolated computing environment can prevent this situation from occurring by using memory elements in which only one or more authorized (system and application) processes may be concurrently executed.

The manner in which isolation is accomplished depends on the type of process that is involved. As a general matter there are two types of processes that may be considered: system and application processes. An isolated computing environment may thus be defined as any computing environment in which a specified maximum number of application processes and specified system processes implementing the computing environment are able to operate. System processes are allowed access to an isolated memory segment if they provide the necessary keys. For example, Intel Software Guard Extension (SGX) technology uses hardware/firmware assistance to provide the necessary keys. Application processes also allowed entry to an isolated memory segment based on keys controlled by hardware/firmware/software element called the Access Control Module, ACM (described later).

Typically, system processes needed to create a computing environment are known apriori to the supervisory program and can be configured to ask and be permitted to access isolated memory segments. Only these specific system processes can then be allowed to run in an isolated memory segment. In the case of application processes such knowledge may not be known apriori. In this case, developers may be allowed to specify the keys that an application process needs to gain entry to a memory segment. Additionally, a maximum number of application processes may be specified that can be allowed concurrent access to an isolated memory segment.

Computing environments are created by code/logic available to supervisory programs of a computer cluster. This code may control which specific system processes are allowed to run in an isolated memory segment. On the other hand, as previously mentioned, access control of application processes is maintained by Access Control Modules.

It is important to highlight the difference between trusted and isolated computing environments. An isolated computing environment is an environment that supports a fixed or maximum number of application processes and specified system processes. A trusted computing environment is an environment in which the digest of the code running in the environment has been verified against a baseline digest.

As an example of the use of isolated memory as an enabling technology, consider the creation of a computing environment as discussed above. The computing environment needs to be configured to permit a maximum number of (application) processes for concurrent execution. To satisfy this requirement, SGX or SEV technologies can be used to enforce isolation. For example, in the Intel SGX technology, a hardware module holds cryptographic keys that are used to control access by system processes to the isolated memory. Any application process requesting access to the isolated memory is required to present the keys needed by the Access Control Module. In SEV and other such environments, the supervisory program locks down the isolated memory and allows only a fixed or maximum number of application processes to execute concurrently.

Consider a computer with an operating system that can support multiple virtual machines (VMs). (An example of such an operating system is known as the Hypervisor or Virtual Machine Monitor, VMM.) The hypervisor allows one VM at a given instant to be resident in memory and have access to the processor(s) of the computer. Working as in conventional time sharing, VMs are swapped in and out, thus achieving temporal isolation.

Therefore, to achieve an isolated environment, a hypervisor like operating system may be used to temporally isolate the VMs and, further, allow only specific system and a known (or maximum) number of application processes to run in a given VM.

As previously mentioned, U.S. patent application Ser. No. 17/094,118 introduced the concept of Access Control Modules (ACM), which allow application processes entry to an isolated memory segment based on keys controlled by hardware/firmware/software element called the Access Control Module (ACM). ACMs are hardware/firmware/software components that use public/private cryptographic key technology to control access. An entity wishing to gain access to a computing environment must provide the needed keys. If it does not possess the keys, it will need to generate the keys to gain access which will require it to solve the intractable problem corresponding to the encryption technology deployed by the ACM, i.e., assumed to be a practical impossibility.

Access to certain regions of memory can also be controlled by software that encrypts the contents of memory that a CPU (Central Processing Unit) needs to load into its registers to execute, i.e., the so-called fetch-execute cycle. The CPU then needs to be provided the corresponding decryption key before it can execute the data/instructions it had fetched from memory. Such keys may then be stored in auxiliary hardware/firmware modules, e.g., Hardware Security Module (HSM). An HSM may then only allow authorized and authenticated entities to access the stored keys.

It is important to note that though a computing environment may be created by supervisory programs, e.g., operating system software, the latter may not have access to the computing environment. That is, mechanisms controlling access to a computing environment are independent of mechanisms that create said environments.

Supervisory Control of Computer Programs

Given the possibility of a computer program exhibiting aberrant behavior, the need to provide the user with an immutable, i.e., fool-proof, supervisory control is acute and paramount. If a user decides to terminate a misbehaving program, can he/she be assured that the disablement will be effective? Perhaps malware, intrusive software or malicious agents may conspire to prevent a computer program (perhaps embodied in a robot) from being disabled. That is, the logic or operation of a so-called kill switch should not be amenable to being changed by the logic of the computer program itself or by external agents. For example, many commercially available computer programs today are provided with a "quit" command to terminate a misbehaving computer program. On some occasions, such quit commands fail to work, and users have to resort to extreme measures such as powering down and re-starting the computer. But power up/down and re-start commands may also be based on software and malware may be used to take control of such software-based commands.

Moreover, computer programs may require periodic updating based on the experiences of the user. But the updating should be under the control of the user. Thus, supervisory control should reside with the manufacturer, but a kill switch should be provided to the user.

Various aspects of the systems and techniques described herein address the aforementioned issues concerning supervisory control of computer programs.

Failure of Conventional Approaches

Before proceeding further, it will be instructive to summarize the failure of conventional approaches to the problem of supervisory control.

Conventional approaches to specifying terminating conditions of computer programs often involve describing the programs from the point of view of machines described in automata theory, e.g., push down automata, state machines, Turing machines, etc. In such descriptions, during execution a program goes through a series of states, where a state is characterized by the values of the program's variables.

Termination conditions then involve specifying one or more conditions which if satisfied by a state, i.e., by the values of the variables in that state, signal that the program is to terminate its execution. The program terminates if it reaches a state where the specified condition is true. For example, consider a program that sorts a list of items, L. A possible terminating condition would be to terminate the execution of the program if the program reaches a state in which the list of items, L, is empty. We could represent this condition as $L=\emptyset \ni S$ where S is the set of states that the program can reach under all inputs. (Note that S may not be finite.)

We now need to show that a given program satisfies its termination property, i.e., execution of the program on all possible inputs reaches a state in which the program's termination condition is true. In other words, we need to prove that the program is correct with respect to the property that all possible executions satisfy the termination property.

But computability theory has shown that to be impossible.

We cannot rely on devising computing code/logic that can guarantee, among other things, that the logic is correct with respect to the termination condition.

Furthermore, aberrant behavior of computer programs may interfere and prevent the program from ever reaching a terminating state.

A solution to the problem of providing supervisory control of computer programs should satisfy the following conditions, which are addressed by some embodiments of the systems and techniques described herein. First, the supervisory command and its logic should exist independently of the computer program. Moreover, the supervisory command and its logic should be protected from being accessed by external agents and/or the computer program itself. Second, the only agent allowed to access the supervisory command should be the designated user of the computer program. Finally, once a supervisory command has been issued it should not be able to be over-ridden, ignored or obviated by the computer program or by input from any other (external) agent.

Approach Used by the Present Invention

We need to distinguish between two types of computer programs, viz., those used in different domains (e.g., image data processing, medical data processing, etc.) and administrative computer programs that manage the latter. We will use the term application logic to refer to computer programs/ code used to make decisions in one or more application environments, e.g., perform financial or image analysis of datasets. We will use the term control logic to refer to computer programs/code that allow administrative control of application programs.

In accordance with one aspect of the systems and techniques described herein, application logic may be made independent of the control logic by encapsulating the application and control logics in distinct trusted and isolated computing environments that communicate between themselves using a certain protocol.

Furthermore, the operation of the computing environment that encapsulates the application logic may be based on solving a certain intractable problem whose solution is provided by the computing environment encapsulating the control logic. Failure to obtain such a solution prevents the application logic from continuing to operate unless it can solve the intractable problem itself-a practical impossibility.

That is, to ensure administrative control, application logic should be arranged so that it periodically needs solutions to intractable problems in order to continue its operations. The needed solutions can be provided by the control logic. However, if an administrative command, e.g., a terminate operation, is issued by the control logic, the periodic supply of solutions to the intractable problems faced by the application logic is interrupted. Thus, the operation of the application logic will cease.

Furthermore, the problems and solutions provided to the application logic is changed periodically or as needed so that the application logic cannot save and re-use a previously supplied solution.

Figure 3:
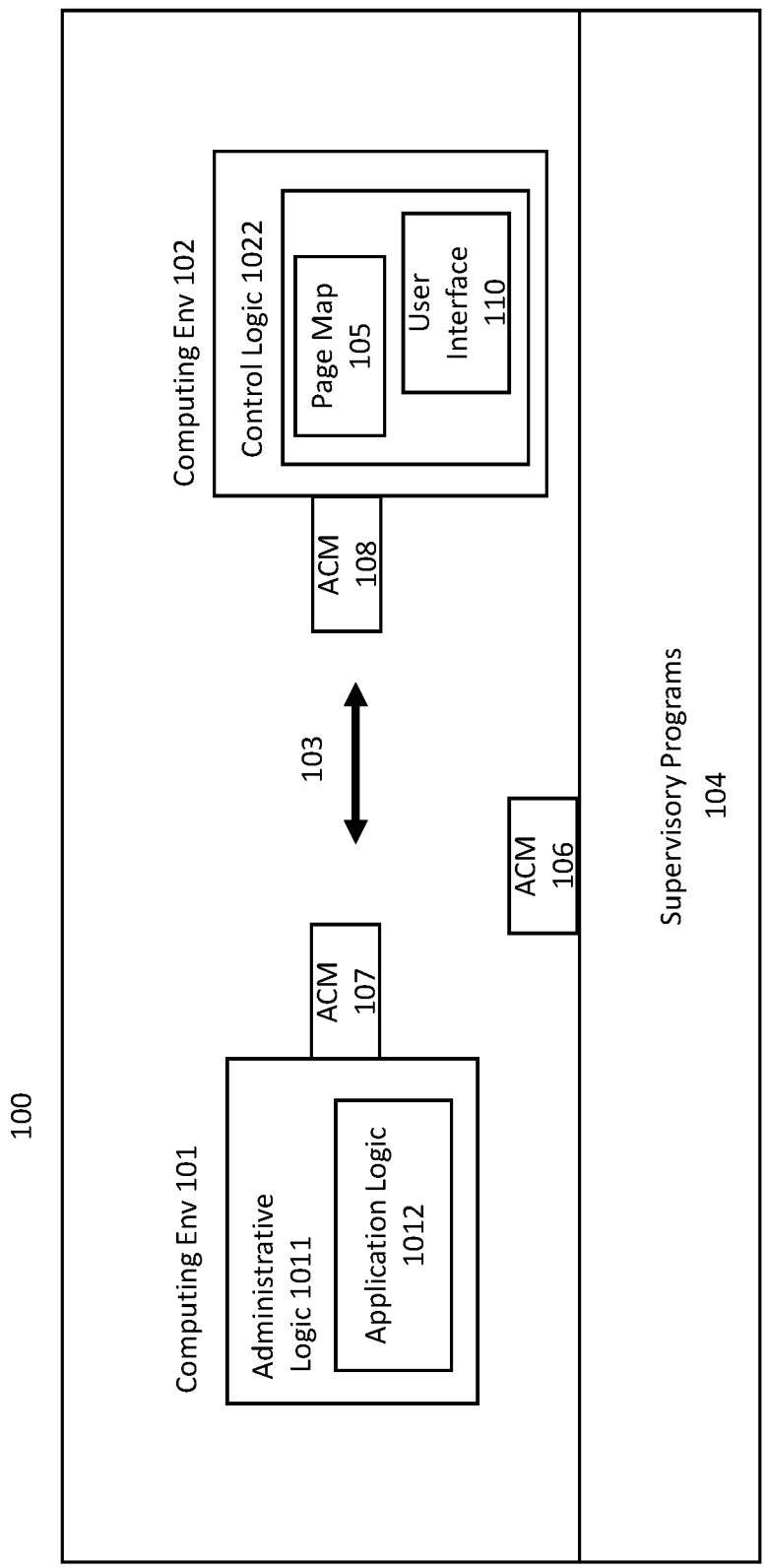
FIG. 3 shows a simplified block diagram of the high-level architecture of the memory of a computer.

FIG. 3 shows a simplified block diagram of the high-level architecture of the memory of a computer 100. Supervisory programs 104 are system processes needed to create an isolated and trusted computing environment. As previously mentioned, the term supervisory programs may be thought of as a generalization of the usual terms used in the literature such as operating system, hypervisor, virtual machine monitor, etc.

In the example of FIG. 1 supervisory programs 104 create trusted and isolated computing environments 101 and 102, i.e., processes. Computing environment 102 represents the execution state of the processes managed by control logic 1022. That is, at any given instant trusted and isolated computing environment 102 contains the instructions/code comprising the control logic 1022, the data used by the control logic and any working, e.g., temporary, elements used by the control logic 1022. While FIG. 1 shows the two computing environments 101 and 102 being located in the same physical computer 100, in other embodiments the computing environments 101 and 102 may be located in different physical computers.

Likewise, computing environment 101 represents the execution state of the programs corresponding to the administrative logic 1011. That is, at any given instant trusted and isolated computing environment 101 contains instructions/code comprising the administrative logic 1011 and any data and working elements used by it, e.g., application logic 1012. (As will be described later, application logic 1012 will be requested and received by administrative logic 1011 from control logic 1022.)

From time to time in the following descriptions, for simplicity of description, we may refer to computing environment 102 as performing certain actions. However, more precisely these actions are performed by the control logic 1022 in the computing environment 102. Likewise, we may sometimes refer to computing environment 101 as performing certain actions. However, more precisely these actions are performed by the administrative logic 1011 in the computing environment 101.

Data link 103 allows the communication of data between computing environments 101 and 102. The type of data link that is employed will depend in part on whether the computing environments 101 and 102 are located in the same or different physical computers. For instance, if the computing environments 101 and 102 are located in a single computer, data link 103 may be a collection of memory cells/registers (or, alternatively, a bus) used to transfer data between computing environment 101 and 102. That is, computing environment 101 may deposit data into the cells of data link 103, which may then be read by the code of computing environment 102, i.e., 1022, and vice versa.

Page map 105 is a data structure contained within control logic 1022 of the computing environment 102. As is described below, page map 105 will contain the instructions comprising the application logic and these instructions will be encrypted. The corresponding encryption/decryption keys also will be stored in the page map 105. Logically, we may think of page map 105 as a table whose columns may be denoted by (encrypted instruction, encryption key, decryption key).

It is important to note that the code comprising the application logic is stored in page map 105, which in turn is contained in computing environment 102. In operation, administrative logic 1011 of computing environment 101 will request and receive an instruction (via data link 103) from control logic 1022 of computing environment 102. That is, computing environment 102 treats the instructions of the application logic 1012 as data which it encrypts and stores in page map 105. In this way, upon request from the administrative logic 1011, the control logic 1022 in computing environment 102 provides an instruction (as data) to computing environment 101 from whence it may be considered (by a processor) as code and executed accordingly. As previously mentioned, the term "instruction" as used herein refers to machine executable instructions.

Since the instruction received from the page map 105 in the computing environment 102 will be encrypted, it will need to be decrypted before execution in the computing environment 101. Thus, administrative logic 1011 in computing environment 101 will need to request and receive the decryption key corresponding to the instruction provided to it by control logic 1022 of the computing environment 102.

To gain operational efficiency, in one embodiment the page map 105 may be organized as follows.

First, the instructions defining the application logic 1012 stored in page map 105 may be partitioned into distinct groups of size "k," where, e.g., k=10. In this particular embodiment we associate encryption and decryption keys with each partitioned group (rather than with individual instructions). Thus, we have effectively partitioned application logic 1012 into a group of partitions that are indexed in the page map 105 by encryption/decryption keys. Thus, we may view page map 105 logically as a table with columns denoted Partition #, Instructions, Encryption Key, and Decryption Key. This logical arrangement of the page map 105 is illustrated in FIG. 8.

In one particular embodiment the unit of communication between computing environments 101 and 102 may be a partitioned group of instructions. That is, when requesting portions of the instructions corresponding to the application logic 1012, administrative logic 1011 in computing environment 101 requests (and receives) a partition of instructions from the control logic 1022 of computing environment 102, along with the corresponding decryption key.

Of course, the instructions that make up the application logic 1012 may be partitioned and stored in the page map 105 in any suitable manner and need not be partitioned in the manner described above. For instance, in some implementations it may even be desirable to partition the application logic so that each discrete instruction that makes it up is stored as its own group with its own encryption and decryption key. Moreover, the unit of communication between computing environments 101 and 102 may or may not correspond to a single partitioned group. That is, when the administrative logic 1011 in computing environment 101 requests instructions, the set of instructions that is provided by the control logic 1022 of the computing environment 102 may or may not correspond to an individual partition group.

Referring again to FIG. 3, ACMs 106, 107 and 108 are hardware/firmware elements that use cryptographic technology to control access to designated memory locations. That is, ACM 107 controls access (by processes) to the memory cells comprising computing environment 101 and ACM 108 controls access (by processes) to memory cells comprising computing environment 102. Likewise, ACM 106 controls access to the memory locations of supervisory programs 104.

Alternatively, as discussed above, we may encrypt sections of computer memory 100 (cf. FIG. 3) and store the corresponding decryption keys in a HSM from whence they may be accessed by the CPU, thereby controlling access to said section of memory.

Note that for clarity ACMs 106, 107 and 108 are represented in FIG. 3 as being contiguous to supervisory programs 104, computing environment 101 and computing environment 102 respectively. However, in some embodiments, ACMs 106, 107 and 108 may be logic contained within supervisory programs 104, computing environment 101 and computing environment 102, respectively.

ACMs 106, 107 and 108 may be programmed (by e.g., supervisory programs 104) to allow/disallow access to given memory locations. To gain access, a process needs to provide suitable credentials which are verified by 107/108. Additional details concerning ACMs and the credentials they may require is discussed in the aforementioned U.S. patent application Ser. No. 17/094,118.

Based on the above discussion, we note the following requirements that are to be satisfied by suitably programming ACMs 106, 107 and 108.

Users are to be allowed to invoke certain functions or processes of control logic 1022. For instance, as shown in FIG. 3, users may invoke a user interface 110 stored within control logic 1022 of computing environment 102. User interface 110 may represent one or more commands that may be invoked by a user to perform certain functions. For example, in some embodiments a user is to be allowed to invoke a kill switch command or a start/pause command. User processes are typically not allowed to access other portions of the control logic 1022 or the page map 105. ACM 108 may achieve such fine-grained access control by using different access mechanisms (e.g., different encryption keys) for accessing the user interface 110, the page map 105 and the control logic 1022 generally.

Control logic 1022 in computing environment 102 needs to invoke supervisory programs 104 and administrative logic 1011 in computing environment 101.

Supervisory programs 104 are disallowed access to computing environments 101 and 102.

The operator/manufacturer is to be disallowed from accessing computing environments 101 and 102. (In embodiments, the manufacturer/operator may configure the computing environments for independent operation before providing it to the user.)

Figure 4:
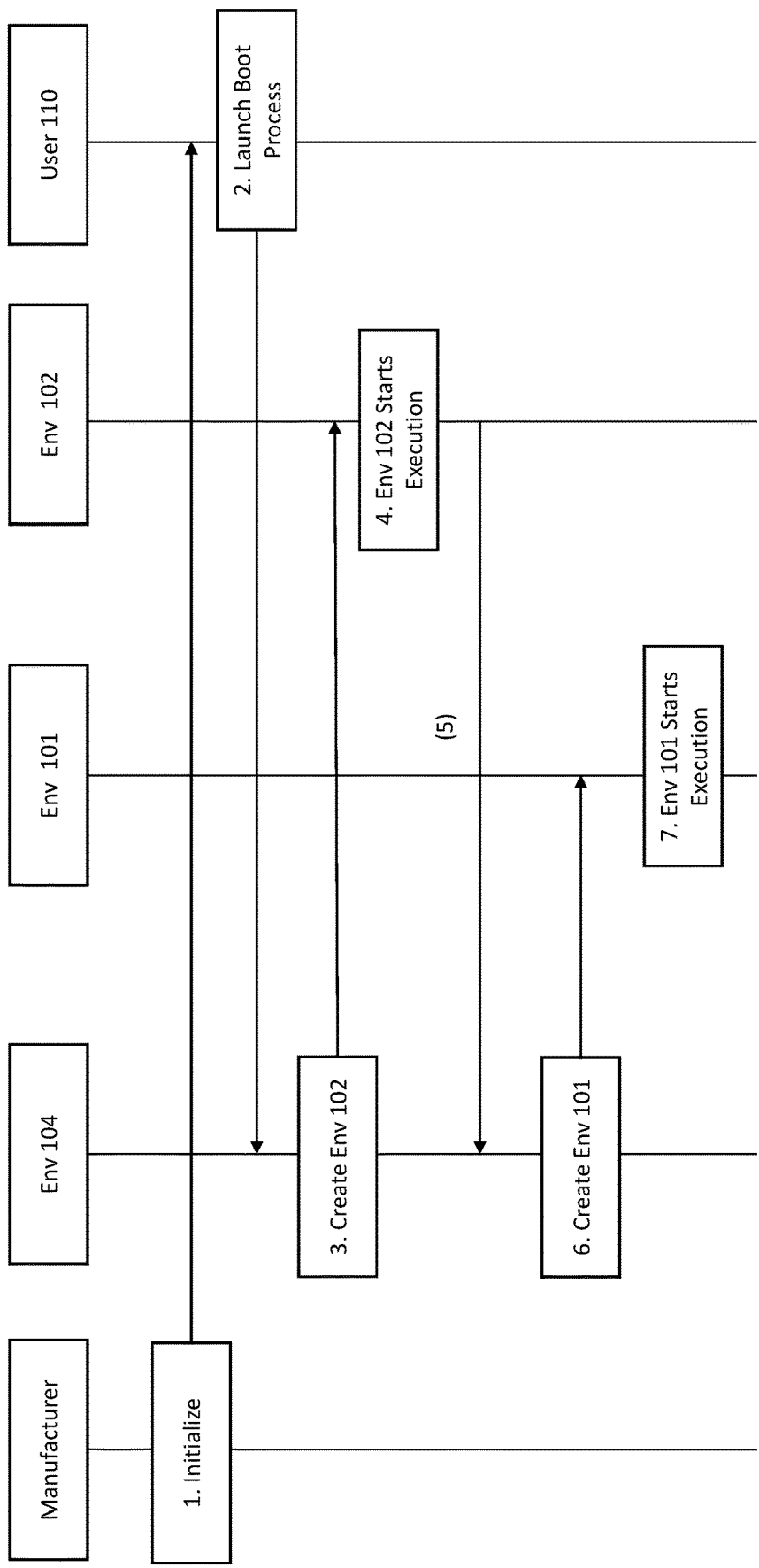
FIG. 4 shows one example of a sequence of steps that may be used to establish the system architecture shown in FIG. 3.

FIG. 4 shows one example of a sequence of steps that may be used to establish the system architecture shown in FIG. 3.

1. The manufacturer provisions the supervisory programs 104 that will be used to initialize the hardware/platform and provides the same to the user.
2. The user launches the platform using the start command which causes the boot process to be initiated.
3. As a part of the boot process, the supervisory programs 104 are programmed to launch a trusted and isolated computing environment 102. Computing environment 102 has certain special properties such as isolation and trust that are described above. It contains programmed logic (i.e., administrative logic 1011) to dictate its operation.
4. Computing environment 102 starts execution.
5. Computing environment 102 requests supervisory programs 104 to launch a trusted and isolated computing environment 101.
6. Supervisory programs 104 create computing environment 101. The latter contains logic (i.e., control logic 1022) to dictate its operation.
7. Computing environment 101 starts operation as per its programmed logic. The latter is programmed to continue its operations until it receives a "stop" command from the user.

Note that, as discussed above, there is no computational guarantee that any application logic to be executed in computing environment 101 will not exhibit aberrant behavior and, e.g., disobey or fail to act on one or more user commands such as "stop."

Figure 5:
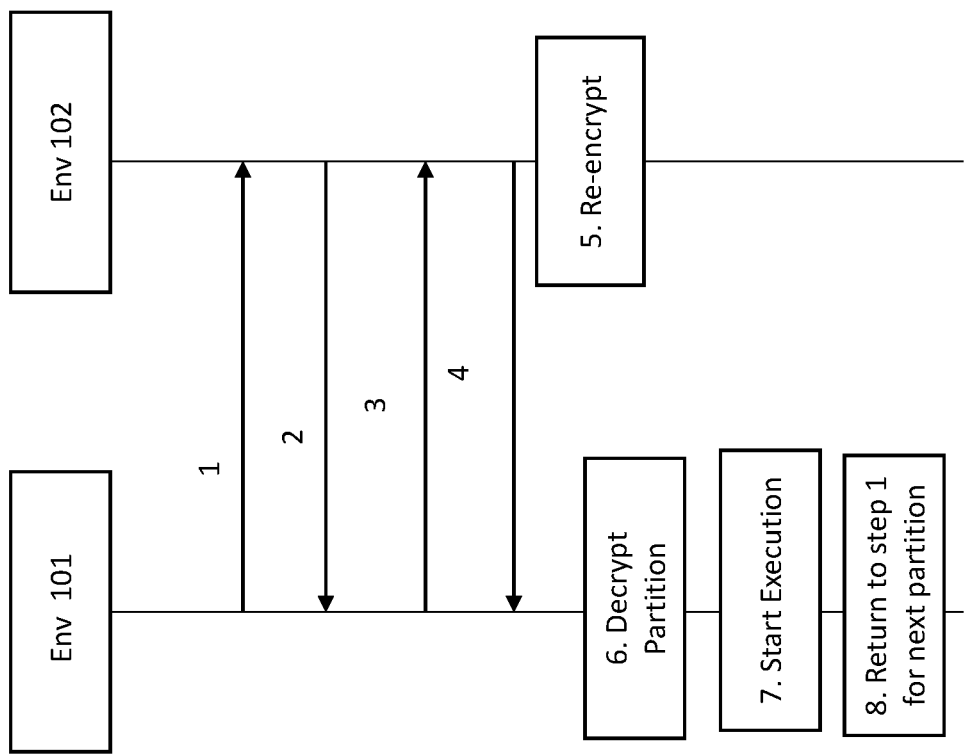
FIG. 5 shows one example of the steps performed when one computing environment requests the partition groups of the decision logic from the page map in another computing environment.

FIG. 5 shows one example of the steps performed when the administrative logic 1011 of computing environment 101 requests the partition groups of the application logic from the page map 105 in computing environment 102. Note that in this example the instructions comprising the application logic are assumed to be organized as shown in FIG. 8, although more generally, as explained above, they may be organized in any suitable manner.

1. Computing environment 101 (i.e., the administrative logic 1011 in the computing environment 101) requests computing environment 102 (i.e., the control logic in computing environment 102) to provide a first partition of the application logic from the page map 105.
2. Computing environment 102 (i.e., the control logic in computing environment 102) consults page map 105 and identifies the requested partition. Note that the returned partition is encrypted. Computing environment 102 provides the requested partition to the computing environment 101.
3. Computing environment 101 (i.e., the administrative logic 1011 in the computing environment 101) requests the decryption key corresponding to the received partition of the application logic from computing environment 102.
4. Computing environment 102 (i.e., the control logic in computing environment 102) consults the page map 105 for the decryption key and returns the same to the computing environment 101.
5. Environment 102 having supplied the decryption key, may now re-encrypt the partition provided in step 2 above using a different encryption key, and update page map 105 accordingly. (This step ensures that a previously sent decryption key cannot be re-used by environment 101.)

6. Computing environment 101 (i.e., the administrative logic 1011 in the computing environment 101) receives the decryption key and uses it to decrypt the received partition of the application logic.
7. Computing environment 101 (i.e., the administrative logic 1011 in the computing environment 101) starts execution of the logic of the received partition of the application logic.
8. The process returns to step 1 if additional partitions of the application logic are needed.

Figure 6:
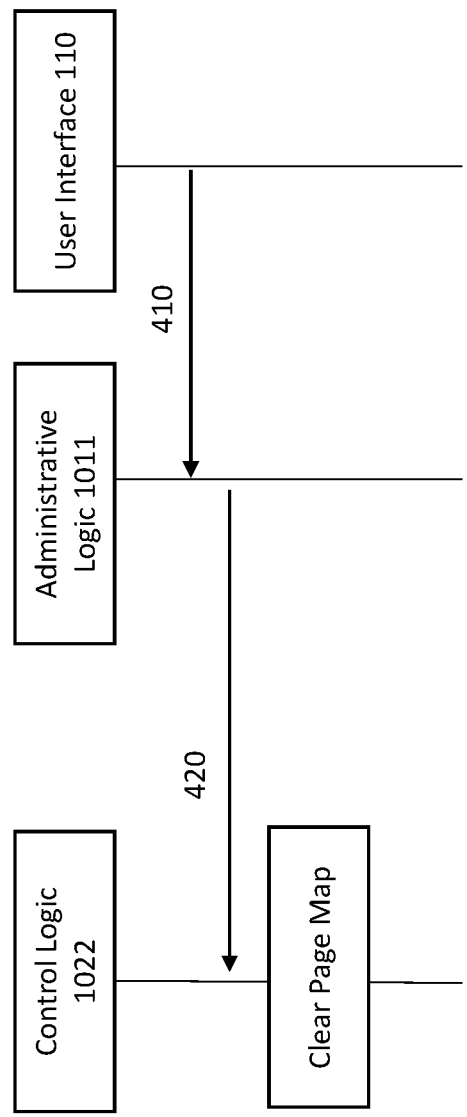
FIG. 6 shows one example of method for terminating the operation of decision logic by issuing a so-called "kill switch" command.

Note that computing environment 101 receives the application logic in encrypted form and needs to decrypt it before starting execution. The decryption key is provided upon request by the control logic 1022 in computing environment 102. Examples of suitable encryption technology has been briefly described above. We note that many encryption functions are known in literature whose corresponding decryption keys can only be obtained if a corresponding intractable computing problem (e.g., the inverse log problem) can be solved. If computing environment 101 wishes to generate the decryption key itself, it needs to be capable of solving the intractable computing problem associated with the encryption/decryption technology being used by computing environment 102. But no such solutions are known. Thus, we note that computing environment 101 cannot proceed without receiving the application logic from computing environment 102 and the corresponding decryption keys. This observation allows the provision of a "kill switch" command. In one embodiment, illustrated in the series of steps shown in FIG. 6, the user interface 110 shown in FIG. 3 is configured to perform the functionality of the "kill switch" command. The method of FIG. 6 proceeds as follows:

1. The user uses user interface 110 to send a user command 410 to administrative logic (cf. 1011 FIG. 3) requesting termination of the application logic (cf. 1012 FIG. 3).
2. Administrative logic 1011 (FIG. 6) requests control logic 1022 (FIG. 6) to issue command 420.
2. Control logic 1022, in response to the received command, zeroes out the contents of page map (cf. 105 FIG. 3), thus severing the supply of decryption keys. Alternatively, control logic 1022 may encrypt the contents of page map 105 using a new encryption key whose decryption key is only known to (or accessible by) pre-determined entities, e.g., the manufacturer of the computer memory 100 (cf. FIG. 3).

Figure 7:
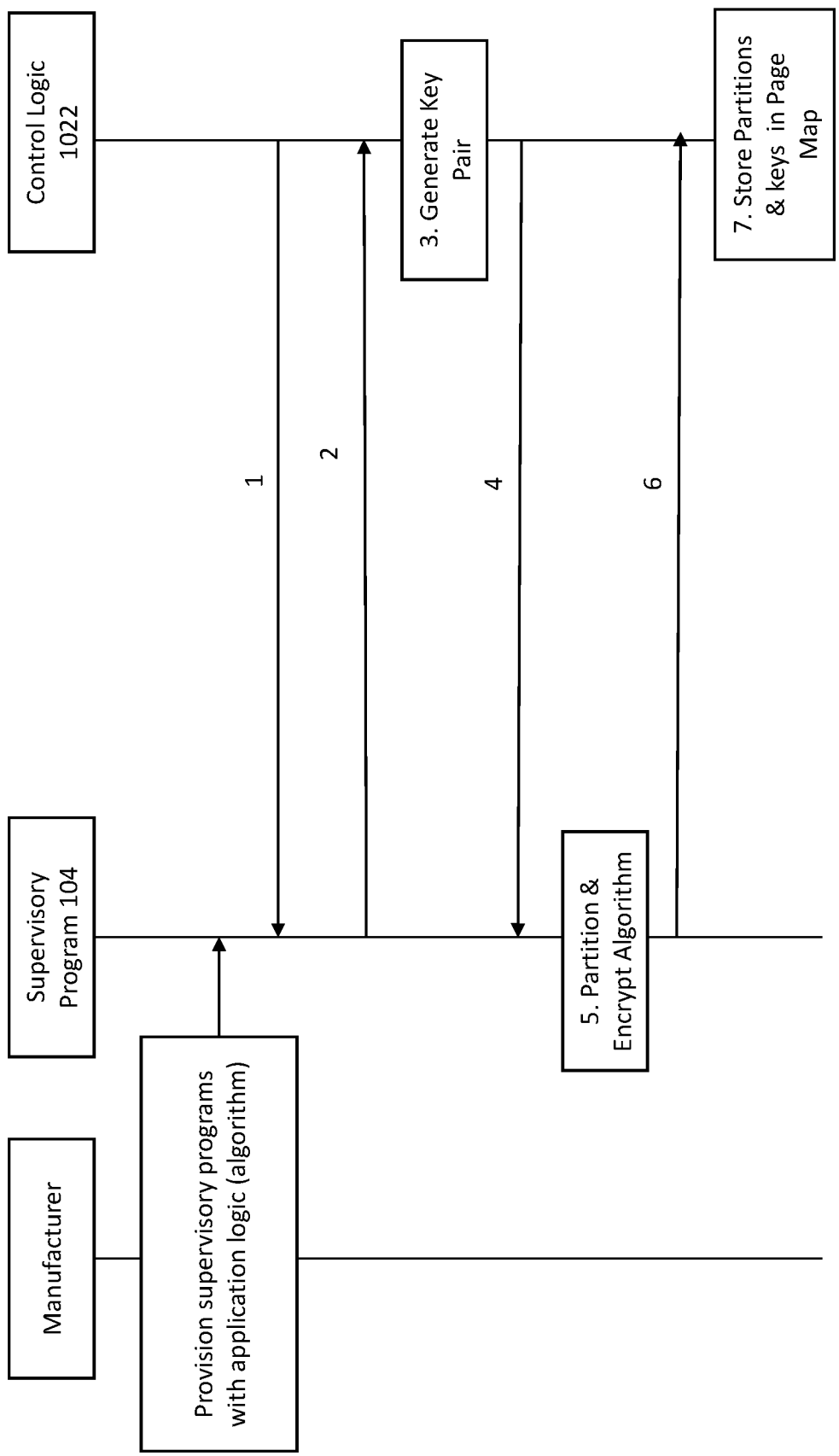
FIG. 7 shows a series of steps that may be performed to provision a computing environment with decision logic in an encrypted and partitioned form.

FIG. 7 shows a series of steps that may be performed to provision the computing environment 102 with the application logic in an encrypted and partitioned form. This example assumes the manufacturer initially provisions the supervisory programs 104 with the necessary application logic. Other embodiments may provision the computing environment 102 with the application logic in an alternative manner. For instance, in some implementations the manufacturer may directly provision the computing environment 102 with the application logic, either prior to partitioning or after partitioning.

The method of FIG. 7 proceeds as follows:
1. Control logic 1022 in computing environment 102 requests supervisory programs 104 to provide it with the application logic that is to be executed in computing environment 101.
2. Supervisory programs 104 requests control logic 1022 to generate N secret/public key pairs.
3. Control logic 1022 generates N pairs of secret/public keys.
4. Control logic 1022 sends the corresponding N public keys to supervisory programs 104.
5. Supervisory programs 104 partitions the algorithm into N partitions numbered 1, 2, . . . , and associates each partition with one of the public keys, and encrypts each partition using its associated key.
6. Supervisory programs 104 sends the encrypted partitions of the algorithm to the computing environment 102.
7. Control logic 1022 receives the partitions of the algorithm and stores the same in page map 105 along with the associated secret/public keys.

We note that the organization of the memory of computing environment 102 as presented above (i.e., associating encryption and decryption keys with partitions of instructions) may be effectuated by suitably modifying the method by which conventional assemblers translate assembled code into machine language instructions. That is, an assembler may be programmed to generate or acquire the needed encryption/decryption keys and associate the same with the assembled (or translated) machine instructions leading to the logical arrangement shown in FIG. 8. Similarly, interpreters may be programmed to generate or acquire the needed encryption/decryption keys and associate the same with the executable instructions that the interpreters generate.

Further Discussion and Considerations

It will be instructive to summarize the situation that has been described so far.

A physical computer has been provisioned with software logic inclusive of algorithms, i.e., application logic, that inter alia may be used for autonomous decision making. The computer is ready to receive inputs provided by users and/or the computer may be configured to receive inputs from one or more sensory devices from its external physical environment.

The processes running inside the computer may be trusted since their code/logic can be compared against baseline code images. Furthermore, the processes are guaranteed to be isolated by the supervisory programs (e.g., operating systems) which, in turn, can also be trusted since they can be subjected to a measurement process.

The processes running the application logic comprise a trusted and isolated computing environment. The latter is configured to request instructions from the computing environment that runs the control logic (which manages the application programs). Thus, the provenance of decisions made by the application logic can be trusted, i.e., that no malware or intrusive software is infecting the computer or its decision-making processes.

However, based on results from computability theory, we know that the application logic may exhibit aberrant behavior at any moment in response to some input, and it may become necessary to disable it.

If a kill command is issued by the user to terminate the operation of the application logic, there will be a time lag between the moment when the decryption keys in the page map are deleted and when the application logic ceases its operation. This time lag can be reduced by increasing the number of partitions into which the application logic is partitioned.

In some respects, the page map 105 may employ memory management techniques used in the paging technology of Ferranti (cf. *A History of Computing Technology*, M. R. Williams, IEEE Computer Society Press, 1997, ISBN 0-8186-7739-2) which can be modified to organize the page map described herein. These techniques, coupled with the technology of public/private key cryptography and that of trusted and isolated computing environments, can be used to design supervisory control mechanisms for computer programs that cannot be circumvented without violating basic assumptions of computability theory.

If quantum computers are ever introduced, the techniques described herein would remain valid by adopting quantum encryption techniques, e.g., lattice-based encryption technology (cf. Ajtai, Miklós (1996). "Generating Hard Instances of Lattice Problems". *Proceedings of the Twenty-Eighth Annual ACM Symposium on Theory of Computing.* pp. 99-108.

Illustrative Applications

The systems and techniques described herein may be employed in many diverse applications areas.

For instance, commercial enterprises are racing to build more and more powerful robots and many reports of the increasing capability of robotic technology are discussed frequently in technical forums and the press. Robots generally incorporate computer programs (i.e., application logic) to arrive at decisions. An autonomous robot is a robot whose computer programs are confined to the physical boundaries of the robot itself. That is, an autonomous robot does not execute or rely on the execution of external/remote algorithms for its decision making. However, the robot may seek or receive input data from resources in its environment. The systems and techniques described herein may be used to terminate the operation of robots generally and autonomous robots in particular.

It should be noted that for present purposes the notion of a robot does not necessarily involve mechanical elements such as actuators, pulleys, sensors, wheels and locomotion, etc., which are popularly used in pictorial representations. We are concerned with the application logic by which the robot makes decisions. The decisions, however, may involve or influence the actions taken by the robot, e.g., the robot may decide to move to a particular location, or move its arm to pick up an object.

Yet another illustrative application of the systems and techniques described herein involve autonomous software systems composed of heuristic algorithms and/or uncertain data as used in artificial intelligence programs. As an example of a different domain of applicability, consider a standalone computer programmed with software logic that can analyze inputted patient data and output diagnosis of a disease. An enterprise may provide such a computer pre-programmed with the disease diagnostic software to, e.g., a household. Members of the household may then enter their symptoms (e.g., headache, temperature, etc.) and the computer may recommend an action, e.g., instruct the household member to contact a medical facility.

Yet another illustrative application involves autonomous decision-making software systems, which may be provided to a group of data scientists who may use them to process large medical, financial or consumer datasets. In some circles, such pre-programmed standalone computers are also called sandboxes. A sandbox may comprise hardware and/or software components, including virtual machine software. Sandboxes may be pre-programmed and supplied by manufacturers as standalone computers, appliances or virtual machines to customers or users.

As another example, a sandbox may contain financial and consumer profile data that is processed by algorithms intended to match consumers with financial loans or credit offers. (Interestingly, automated financial decisions made by sandboxes may be freed of racial or gender biases sometimes faced by, e.g., human loan officers. Similarly, drug therapies recommended by sandboxes may be freed of certain biases displayed by human physicians.)

In the above applications and use cases, various constraints must be satisfied to assure manufacturers and users. For example, manufacturers need assurances that the software code cannot be copied or controlled by malicious agents. Users need to be assured that computer programs operating in autonomous fashion can be controlled upon exhibiting aberrant behavior.

It is also important that control of computer programs cannot be taken over by remote malicious entities.

Technical Advantages

The descriptions presented above have highlighted various technical contributions of the present inventions to software technology, e.g., joint and constrained supervisory control of computer programs, preventing malicious entities from gaining control of computer programs, etc. We point out a few additional contributions.

Isolated and trusted software process technology is expected to be a crucial foundation in enhancing the security and privacy of software systems and many commercial enterprises are exploring the use of this technology, e.g., Confidential Computing Consortium established by IBM, Google, Microsoft, Intel, etc.

An isolated and trusted process may be viewed as a "black box" in which a computation executes, and which cannot be accessed by any entity, including the supervisory programs of the underlying computer. The techniques described herein provide methods to control the execution occurring inside the black box by (1) introducing a new method of organizing the internal memory of the isolated and trusted processes, and (2) inserting a method of inter-process communication into the execution process. The latter, i.e., the execution, can then be controlled by disrupting the inter-process communication upon issuance of a user command.

Furthermore, the disruption of the inter-process communication cannot be overcome by any entity, including the underlying computer or any of its software components, without violating fundamental aspects of computability theory. That is, we have shown that the isolation and trust of software processes can be controlled, enhanced and maintained by basing them on the hardness of well-studied computational problems.

Furthermore, the disruptions to the inter-process communication and the ensuing control mechanisms will remain in effect even if and when quantum computers come into vogue.

Illustrative Computing Environment

As discussed above, aspects of the subject matter described herein may be described in the general context of computer-executable instructions, such as computer programs, being executed by a computer or a cluster of computers. Generally, computer programs include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described exemplary embodiments.

The invention claimed is:

1. A method for controlling execution of application code defining a computer program, comprising:

(i) receiving a request from a first trusted and isolated computing environment for receipt of a first partition group of the application code, the application code being formed from a plurality of machine executable instructions that are partitioned into a plurality of partition groups that each contain at least one of the machine executable instructions in an encrypted form, wherein a trusted computing environment is a computing environment whose computer code is able to be attested by comparing a digest of the computing environment to a baseline digest of the computing environment that is available to third parties to thereby verify computing environment integrity, an isolated computing environment being a computing environment in which only a specified maximum number of application processes and specified system processes implementing the computing environment are able to operate;

(ii) responsive to receipt of the request, sending the encrypted machine executable instructions in the first partition group from a second trusted and isolated computing environment to the first trusted and isolated computing environment;

(iii) subsequent to receipt of the first partition group by the first trusted and isolated computing environment, receiving a request from the first trusted and isolated computing environment for one or more decryption keys for decrypting the encrypted machine executable instructions in the first partition group and sending the one or more decryption keys to the first trusted and isolated computing environment; and (iv) repeating (i)-(iii) for one or more subsequent partition groups that make up the application code unless a termination command is received from a user by the second trusted and isolated computing environment, the termination command being configured to prevent from being sent to the first trusted and isolated computing environment any of the subsequent partition groups in the plurality of partition groups and/or any of the one or more decryption keys for decrypting the encrypted machine executable instructions in the subsequent partition groups.

2. The method of claim 1 wherein a request from the first trusted and isolated computing environment for receipt of one of the subsequent partitions is received subsequent to initiation of execution of the machine executable instructions in previously received ones of the first partition group.

3. The method of claim 1 wherein the requests from the first trusted and isolated computing environment are received by control logic operating in the second computing environment such that the second computing environment represents an execution state of processes managed by the control logic.

4. The method of claim 3 wherein the plurality of partition groups that each contain at least one of the encrypted machine executable instructions and the decryption keys for decrypting the encrypted machine executable instructions are stored in a page map associated with the control logic.

5. The method of claim 3 wherein the termination command causes the page map to be cleared of the partition groups and/or the decryption keys associated with the partition groups.

6. The method of claim 3 wherein the termination command causes the encrypted machine executable instructions in the page map to be re-encrypted with a different encryption key from that previously used such that the decryption keys in the page map are unable to decrypt the encrypted machine executable instructions.

7. The method of claim 1 wherein the first and second computing environments are located in a common physical computing machine.

8. The method of claim 1 wherein the first and second computing environments are located in different physical computing machines.

9. The method of claim 1 wherein each of the encrypted machine executable instructions in a common one of the partition groups are decrypted using a common decryption key.

10. The method of claim 9 wherein encrypted machine executable instructions in different ones of the partition groups are decrypted using different decryption keys.

11. The method of claim 1 further comprising receiving the termination command from the user and preventing responses from being sent in response to any further requests for any of the subsequent partition groups in the plurality of partition groups and/or any of the one or more decryption keys for decrypting the subsequent partition groups.

12. A method for executing application code defining a computer program, comprising:
(i) requesting from a second trusted and isolated computing environment receipt of a first partition group of the application code, the application code being formed from a plurality of machine executable instructions that are partitioned into a plurality of partition groups that each contain at least one of the machine executable instructions in an encrypted form, wherein a trusted computing environment is a computing environment whose computer code is able to be attested by comparing a digest of the computing environment to a baseline digest of the computing environment that is available to third parties to thereby verify computing environment integrity, an isolated computing environment being a computing environment in which only a specified maximum number of application processes and specified system processes implementing the computing environment are able to operate;
(ii) receiving the encrypted machine executable instructions in the first partition group from the second trusted and isolated computing environment;
(iii) requesting from the second trusted and isolated computing environment one or more decryption keys for decrypting the encrypted machine executable instructions in the first partition group and receiving the one or more decryption keys in the first trusted and isolated computing environment; and
(iv) repeating (i)-(iii) for one or more subsequent partition groups that make up the application code unless a termination command is received from a user by the second trusted and isolated computing environment, wherein, responsive to the termination command, no further ones of the subsequent partition groups and/or any of the one or more decryption keys for the subsequent partition groups are received by the first trusted and isolated computing environment, from the user by the second trusted and isolated computing environment.

* * * * *